United States Patent [19]

Kondou et al.

[11] Patent Number: 5,247,682
[45] Date of Patent: Sep. 21, 1993

[54] SYSTEM AND METHOD FOR THE AUTOMATIC SETTING OF A COMPUTER SYSTEM'S I/O CONFIGURATION

[75] Inventors: Yoshimasa Kondou; Masaaki Hanaoka; Shinji Nakamura; Fumiaki Doi, all of Suwa, Japan

[73] Assignee: Seiko Epson Corporation, Tokyo, Japan

[21] Appl. No.: 666,291

[22] Filed: Mar. 8, 1991

[30] Foreign Application Priority Data

Mar. 9, 1990 [JP] Japan ................................. 2-58343
Sep. 28, 1990 [JP] Japan ................................. 2-260181
Feb. 12, 1991 [JP] Japan ................................. 3-018789

[51] Int. Cl.⁵ .......................................... G06F 9/445
[52] U.S. Cl. ................................... 395/700; 364/280.2
[58] Field of Search ............................ 395/275, 700; 364/280.2

[56] References Cited

U.S. PATENT DOCUMENTS

| | | | |
|---|---|---|---|
| 4,300,193 | 11/1981 | Bradley et al. | 395/275 |
| 4,562,535 | 12/1985 | Vincent et al. | 395/325 |
| 5,014,193 | 5/1991 | Garner et al. | 395/275 |
| 5,068,780 | 11/1991 | Bruckert et al. | 395/700 |

*Primary Examiner*—Dale M. Shaw
*Assistant Examiner*—Lance Leonard Barry
*Attorney, Agent, or Firm*—Raymond J. Werner

[57] ABSTRACT

A method of configuring a computer system having internal and external Serial Input/Output (SIO) ports, includes determining the designation of each SIO port present in the system as being either primary, secondary, or disabled. The designations of the physically present SIO ports are used to update the contents of a non-volatile memory. Prior to updating the non-volatile memory, a read operation is performed on the non-volatile memory. If the non-volatile memory presently reflects the status of the physically present SIO ports, the updating of the non-volatile memory is bypassed.

2 Claims, 8 Drawing Sheets

| BIT # | DESCRIPTON |
|---|---|
| 0-1 | RESERVED |
| 2 | 0 : INTERNAL DISPLAY DEVICE<br>1 : EXTERNAL DISPLAY DEVICE |
| 3-7 | RESERVED |

| EXTERNAL SIO SETTING | | INTERNAL SIO SETTING | |
|---|---|---|---|
| FIRST | SECOND | PREVIOUS | UPDATED |
| – | – | DISABLED | PRIMARY |
| PRIMARY | – | | SECONDARY |
| SECONDARY | – | | PRIMARY |
| PRIMARY | SECONDARY | | DISABLED |
| – | – | PRIMARY | PRIMARY |
| PRIMARY | – | | SECONDARY |
| SECONDARY | – | | PRIMARY |
| PRIMARY | SECONDARY | | DISABLED |
| – | – | SECONDARY | PRIMARY |
| PRIMARY | – | | SECONDARY |
| SECONDARY | – | | PRIMARY |
| PRIMARY | SECONDARY | | DISABLED |

SYSTEM AND METHOD FOR THE AUTOMATIC SETTING OF A COMPUTER SYSTEM'S I/O CONFIGURATION

BACKGROUND OF THE INVENTION

1. Field of the Invention

The present invention relates to computer systems that can be expanded by the attachment of external input/output (I/O) devices that compliment and/or extend internal I/O device functions. Common "laptop" computers typically have several internal I/O devices, such as floppy and hard disk drives, a display, and a keyboard. These and other personal computers further routinely permit the "adding-on" of external I/O devices. Expansion devices such as a co-processors and memory expansion memory boards (e.g., co-processors with extended RAM) may also be added-in. The CPU processing speed and overall system functionality can often be improved by such external I/O and expansion devices.

2. Description of Related Art

In the prior art, personal computer systems software had to be manually preconfigured before the start-up of a newly configured system to accept and work with add-on external I/O or expansion devices in a system. The preconfiguration was often a very technical procedure not easily understood or dealt with well by a typical user. The procedures usually focus on the manipulation of one or more bytes of memory that are writeable but not volatile, such as a battery backed-up memory (e.g., CMOS battery-backed RAM). The computer then reads these bytes, called configuration bytes, during a boot-up and initialization procedure commonly executed in the "BIOS" (for basic input/output system) ROM. The configuration bytes will thereafter inform various device drivers and the disk operating system (DOS) which actual I/O devices are to be used for disk, display, print output, keyboard input, etc. The factory, or often a computer dealer, will set the configuration bytes to reflect the I/O system actually installed or the one that is expected to be installed. Any later modifications by the user to the I/O system, such as the buying and attaching of a hard disk, may not work, unless the configuration bytes are re-written by the arcane prior art methods.

Because of their machine's portability, many users of lap-top computers only temporarily use certain external I/O and expansion devices. But the clumsy utilities provided by some systems suppliers used to update the configuration bytes must be run by the user each time the I/O system is changed. Otherwise, the add-in/add-on devices will not be recognized by the system. This manual intervention into the bowels of the computer's operating system can be very tedious and can require a high degree of technical skill to run such a utility. Many users do not have the experience to know that such a utility even exists. So it goes unused or misapplied. Therefore an automatic method of configuration byte updating that is compatible with currently available computer systems is needed.

SUMMARY OF THE INVENTION

It is an object of the present invention to provide a computer system that can automatically adapt to the attachment and/or disconnection of optional peripheral I/O devices and add-in expansion boards.

Briefly, a computer system embodiment of the present invention comprises (1) a computer-implemented process (utility) for checking at startup the presence of optional expansion boards or peripheral I/O devices in the computer system; (2) a mode selection computer-implemented process (utility) for indicating whether or not the computer system shall be employed to automatically determine which optional expansion boards or peripheral I/O devices are or are not active; and (3) a correction computer-implemented process (utility) for directing the computer system to use particular optional expansion boards or peripheral I/O devices and/or their internal device counterparts. The correction utility is such that if the mode selection utility indicates automatic mode, then the utility for checking is employed to update the means for storing. Otherwise, if automatic mode is not enabled, then the utility for storing is used.

An advantage of the present invention is that optional expansion boards or peripheral I/O devices may be more freely attached and disconnected to a computer system than before. Such a computer system, if in the present invention's automatic mode, will thereafter adapt to whatever the user provides in the way of optional expansion boards or peripheral I/O devices.

A further advantage of the present invention is that the automatic and routine checking of what optional expansion boards or peripheral I/O devices exist in a computer system can be disabled such that the time spent to do such checking is saved. The automatic configuration updating ability however can be invoked by the user at any time in such a way that the user is relieved of having to determine what optional expansion boards or peripheral I/O devices are or are not present.

A further advantage of the present invention is that where a defective external I/O device or add-in board has been added-on, the defect can often be detected during boot-up and an error message or other appropriate signal may be produced.

These and other objects and advantages of the present invention will no doubt become obvious to those of ordinary skill in the art after having read the following detailed description of the preferred embodiments which are illustrated in the various drawing figures.

DESCRIPTION OF THE PREFERRED EMBODIMENTS

Figure 1:
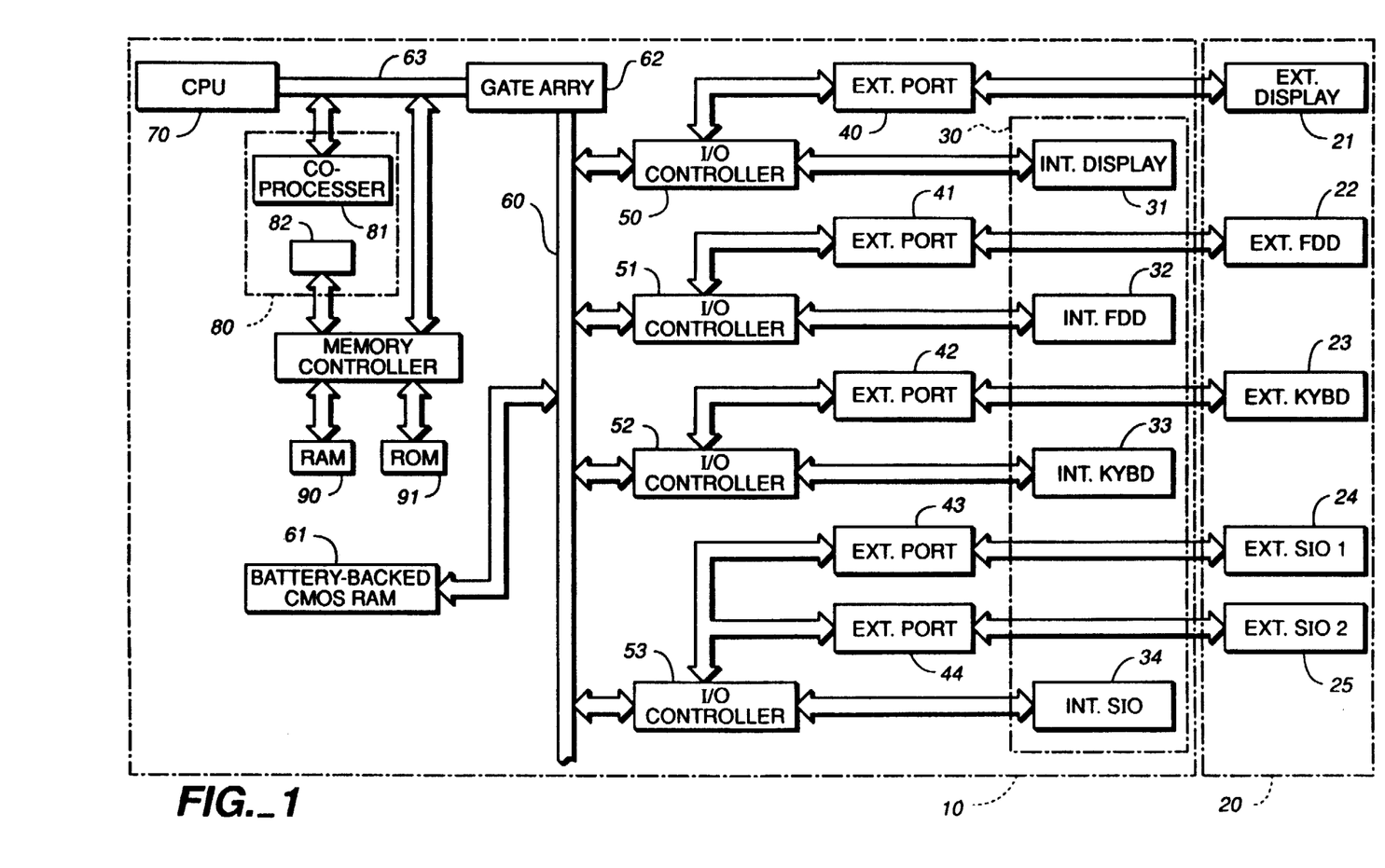
FIG. 1 is a block diagram of a first embodiment of the present invention.

FIG. 1 illustrates a computer system 10 that is connected to external I/O devices 21-25 which form an external peripheral group 20. Computer system 10 also has an internal peripheral group 30 that is comprised of an internal display device 31, an internal floppy disk drive 32, an internal keyboard 33, and an internal serial I/O (SIO) device 34. The four I/O devices (31-34) within internal peripheral group 30 are managed by four I/O controllers 50-53. Internal SIO device 34 can, for example, be a low-speed printer type that controls printing on the bit level. External ports 40-44 interface I/O controllers 50-53 to both the internal I/O devices 31-34 and external I/O devices 21-25, respectively. (Note: only one internal SIO device 34 is shown.) External ports 40-44 respectively provide the interfacing necessary for display device 21, floppy disk drive 22, keyboard 23 and SIO devices 24 and 25. An internal bus 60 is common to I/O controllers 50-53 as well as a battery backed-up RAM 61. RAM 61 is preferably a CMOS type static RAM. The CMOS RAM 61 is used to store execution requests and user configuration settings, because data stored will not be lost when the power to system 10 is turned-off. Internal bus 60 interfaces to a system bus 63 via gate array 62. A central processing unit (CPU) 70, an add-in board 80, a main memory (RAM) 90, and a control memory (ROM) 91 all communicate with each other over system bus 63. The add-in board 80, for example, includes a CPU co-processor 81 and an expansion RAM 82. ROM 91 stores a BIOS (basic I/O system) program that is typical for these kinds of systems, and as such, the BIOS includes a device configuration utility that allows a programmer or user to configure which physical I/O devices the system will assign as being particular logical devices (which are sometimes called logical files). By running the device configuration utility, settings within CMOS RAM 61 are changed to what the user wants as a startup I/O device configuration relative to any additions of external I/O devices 20 or add-in board 80.

Figure 2:
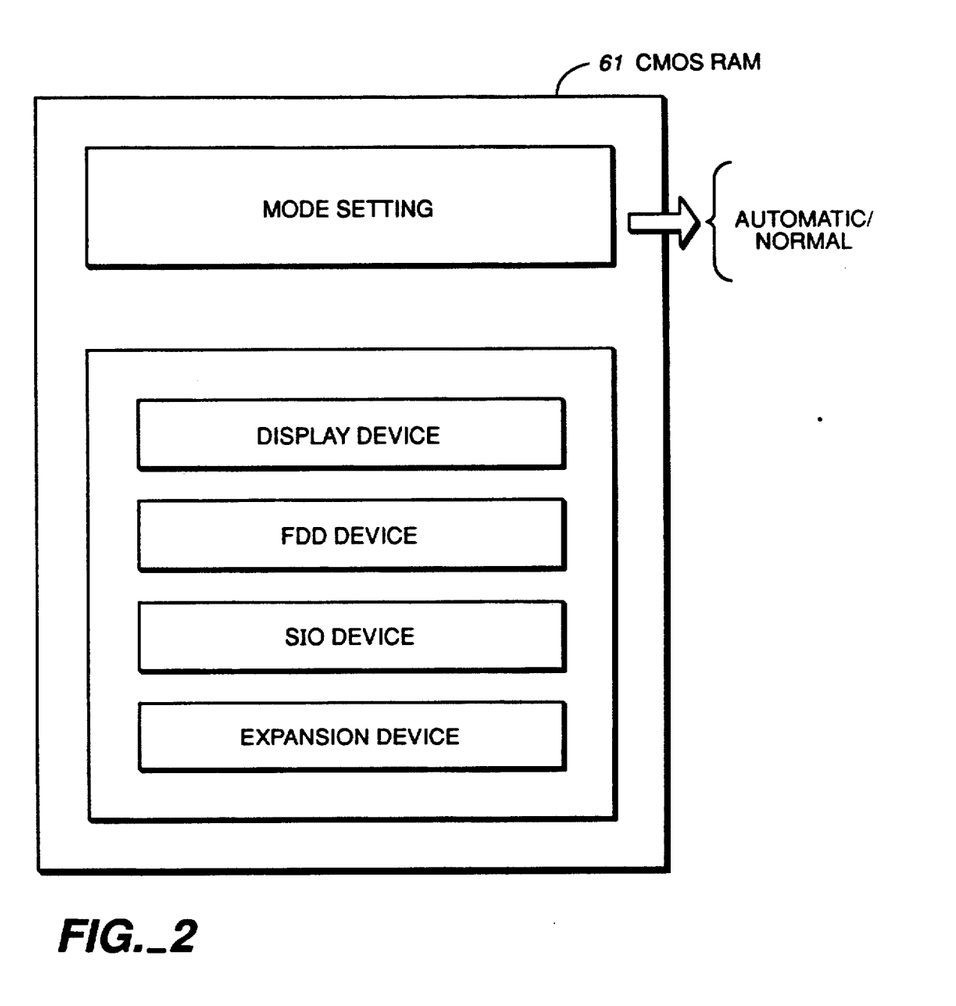
FIG. 2 shows a preferred set of configuration byte/bit definitions in memory, e.g., CMOS RAM 61.

FIG. 2 maps a few of the bytes of memory in CMOS RAM 61. Included is a mode setting that is used to indicate during boot-up whether automatic or normal mode of operation is desired. If automatic mode, this first embodiment of the present invention will figure out what I/O devices have been added-in or added-on and then adjust the logical I/O device and system configuration accordingly. Other locations in CMOS RAM 61 are used to indicate preferences between internal display device 31 and external display device 21, assignment of "A" drive or "B" drive designations for internal and external floppy disk drives 32 and 22, the port addresses assigned for one internal and two external SIO devices 34, 24, and 25, respectively, and whether to figure in add-in board 80 during start-up initialization.

Figure 3:
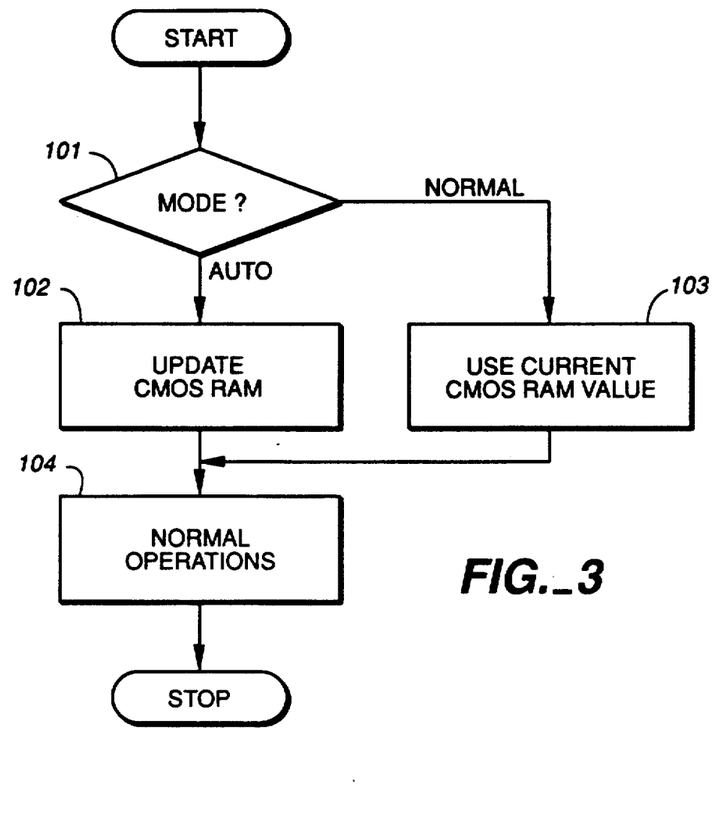
FIG. 3 is a flow chart of automatic versus normal mode of operation.

FIG. 3 shows the basic automatic/normal mode control program flow. After a user starts-up computer system 10, a device configuration utility is executed during system initialization/start-up. The device configuration utility is preferably stored in ROM 91 as part of the BIOS program. A test of the data present in CMOS RAM 61 is made in step 101. If the data indicate automatic mode has been enabled, the preferences the user has indicated for the various external I/O devices and add-in board 80 are checked in step 102 by going out to each such device to see if they are actually present as indicated. If the actual startup configuration and settings within CMOS RAM 61 do not agree, the respective settings within CMOS RAM 61 are modified to reflect the actual startup configuration. But if normal mode is detected in step 101, then in step 103, computer system 10 will not take the time to check the actual start-up configuration, and will simply initialize the system using whatever configuration the data in CMOS RAM 61 indicates. (In other words, the configuration is taken at face value.) Even if normal mode is enabled, an automatic setting function similar to that described above for automatic mode is supported if a user makes an appropriate request. For example, such a request may be made by pushing a particular function key during or after boot-up. Step 104 indicates normal operation of computer system 10 follows thereafter.

Figure 4:
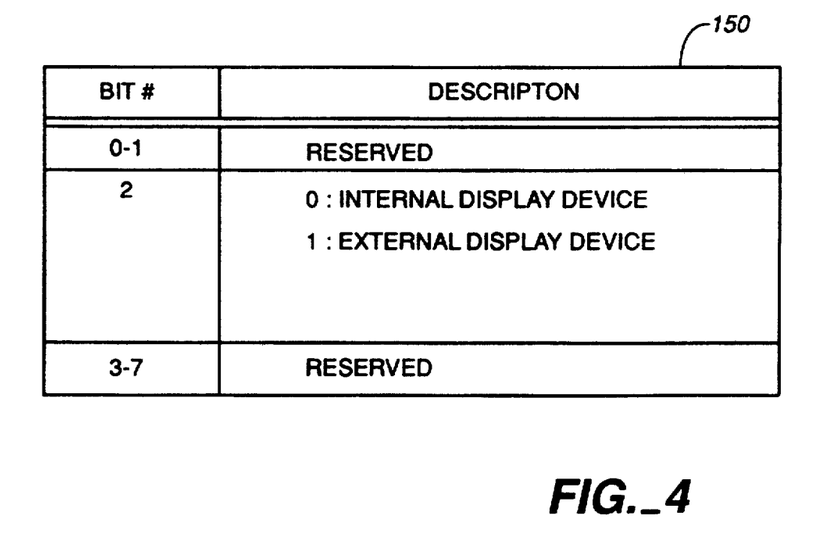
FIG. 4 shows the bits in an exemplary internal control register and their meaning.

FIG. 4 is an example of the way data bits are defined in an internal control register 150 located within I/O controller 50. Such configuration bytes and/or their bits are also referred to in the art as flags. Controllers 51-53 are similar. Only bit number two is not reserved. Bit two in internal control register 150 indicates with "0" or "1", respectively, whether the display device is internal (e.g., display 31) or external (e.g., display 21). External display device 21 is connected to external port interface 40. The I/O controller 50 steers activity to internal display device (LCD, etc.) 31 or external display device (CRT, etc.) 21. The actual control is implemented with a register located in I/O controller 50.

Figure 5:
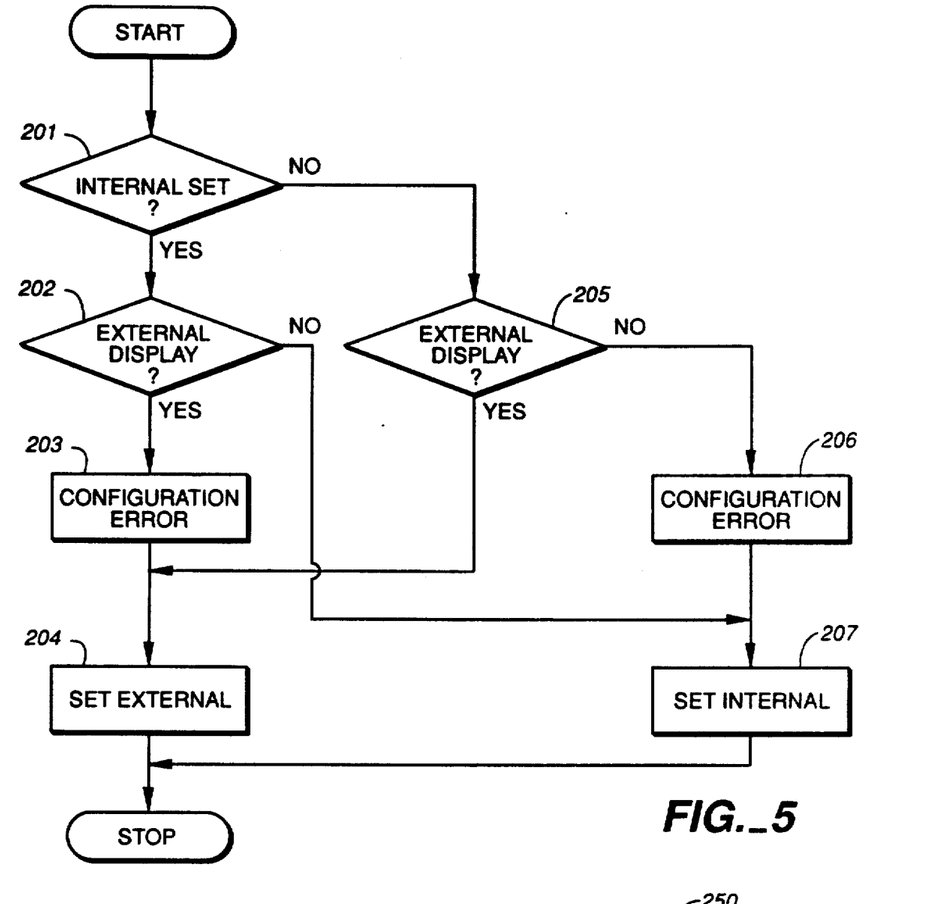
FIG. 5 is a flow chart of an exemplary subroutine for selecting the display device.

FIG. 5 is a flowchart of a sub-routine that automatically tests and sets internal control register 150 (FIG. 4). In step 201, a test is made to see if the internal display 31 is enabled (bit two of byte 150=0?). If not, step 205 tests to see if an external display 21 is connected. If not connected, an error has been detected, step 206, and the internal display is enabled in step 207 by setting internal control register 150 appropriately. (Whether any external display device 21 has or has not been connected by start-up can be determined by trying to read its display register color intensity data at standard port address.) If step 205 indicates the presence of an external display 21, then no error is made and controller 50 is set to interface with external display 21 in step 204. If step 202 detects an external display 21 is present, then a policy preference to favor the external peripheral (if present) takes over, and control passes to step 204 to set external display operation. If step 201 sees that the internal display is set and there is no external display detected in step 202, then step 207 sets a bit in internal control register 150 to use internal display 31. When normal operations begin, e.g., in step 104 of FIG. 3, the contents of CMOS RAM 61 will again be read in the customary fashion for BIOS programs to direct display activity to either internal display 31 or external display 21. (Controller 50 can be used to direct such activity.) In automatic mode, the above sub-routine will favor the external display 21 if it is present and will automatically switch to internal display 31 if external display 21 is not present.

Figure 6:
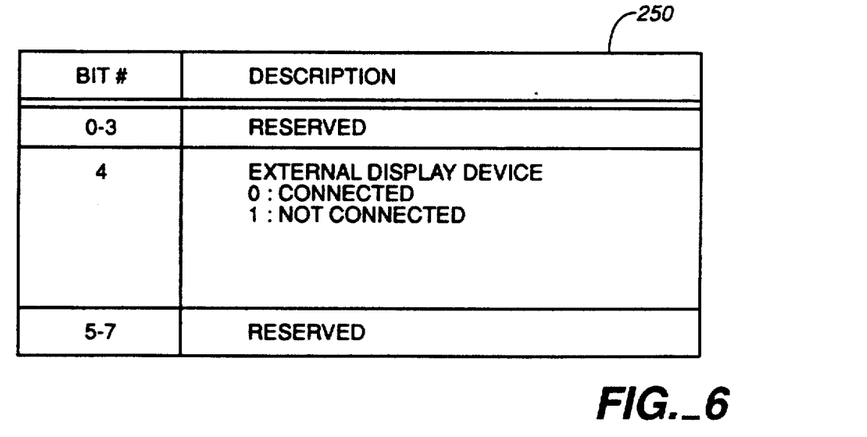
FIG. 6 shows the bits in an exemplary internal port and their definition.

FIG. 6 shows, how the presence or absence of external display 21 can be determined. If external display 21 is present, then bit number four in a control register 250 will be a zero, otherwise it will be a one. The other bits in the control register 250 are not needed, and so are reserved. Any of the other bits 0-3 and 5-7 could have been used, but convention has it that bit four in this example is used to indicate the presence of external device 21.

Figure 7:
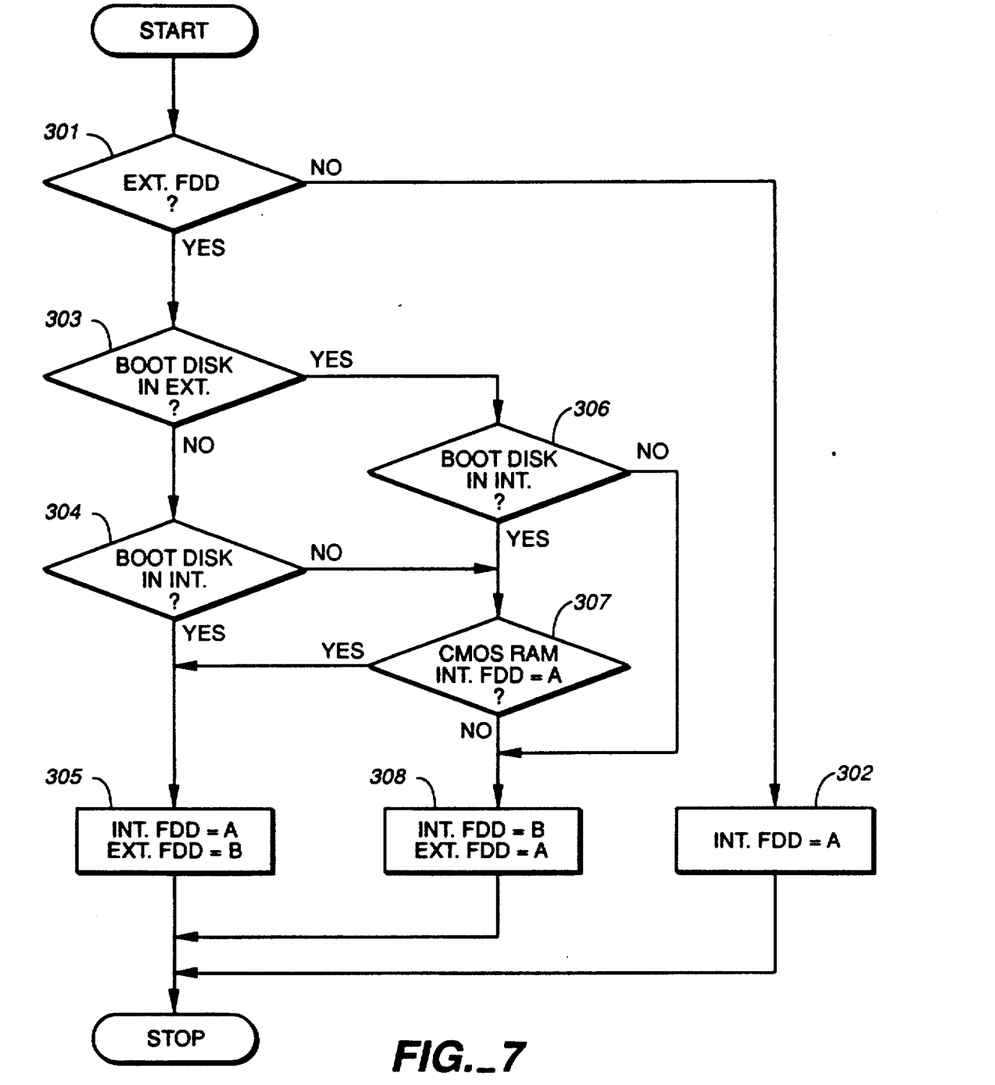
FIG. 7 is a flow chart of an exemplary subroutine for automatically selecting between internal/external floppy disk drives.

FIG. 7 is a flowchart of a subroutine to assign logical device labels "A" and "B" to the physical drives for the different combinations of internal and external disk drives that are possible. The assignment of logical to physical devices, as mentioned here and elsewhere, is sometimes referred to in the art as logical-to-physical-device mapping. (Or vice versa.) In step 301 a test is made to see if an external floppy disk drive (FDD) 22 has been attached to external port interface 41. If not, step 302 designates internal FDD 32 as drive "A" and writes the appropriate configuration byte to CMOS RAM 61. But if an external FDD 22 is detected, step 303 will test to see if a boot disk has been inserted into external FDD 22. (Any disk inserted in the drive will be treated as a boot-disk, if the disk is not a boot-disk, a "non-system" disk error will result.) If a disk is not detected, a test is made in step 304 to see if internal FDD has a boot-disk. In step 305, if a boot disk is present, internal FDD 32 is designated drive "A" (Step 305) and external FDD 22 is designated drive "B". If a boot disk was detected as having been inserted in external FDD 22, in step 303, a test is made in step 306 to see if a boot disk had been inserted into internal FDD 32. If a boot disk is detected in internal FDD 32, the setting of whether internal FDD 32 is drive "A" in CMOS RAM 61 is made in step 307. If internal FDD 32 has already been set as drive "A", then control falls to step 305. Otherwise, step 308 is executed which sets internal FDD 32 to be drive "B" and external FDD 22 to be drive "B".

In this manner, the floppy disk drive with the boot-disk inserted into it is detected and it is designated drive "A", regardless of any previous setting by the user in CMOS RAM 61. (The other floppy disk drive is, of course, designated drive "B".) The choice of the drive "A" and "B" may be changed at any time after the boot-up, by traditional methods known to those skilled in the art. A discussion of those methods is not important to this disclosure of the present invention. As a final note, if an external floppy disk drive 22 has not been installed, internal floppy disk drive 32 is always designated as drive "A".

Figure 8:
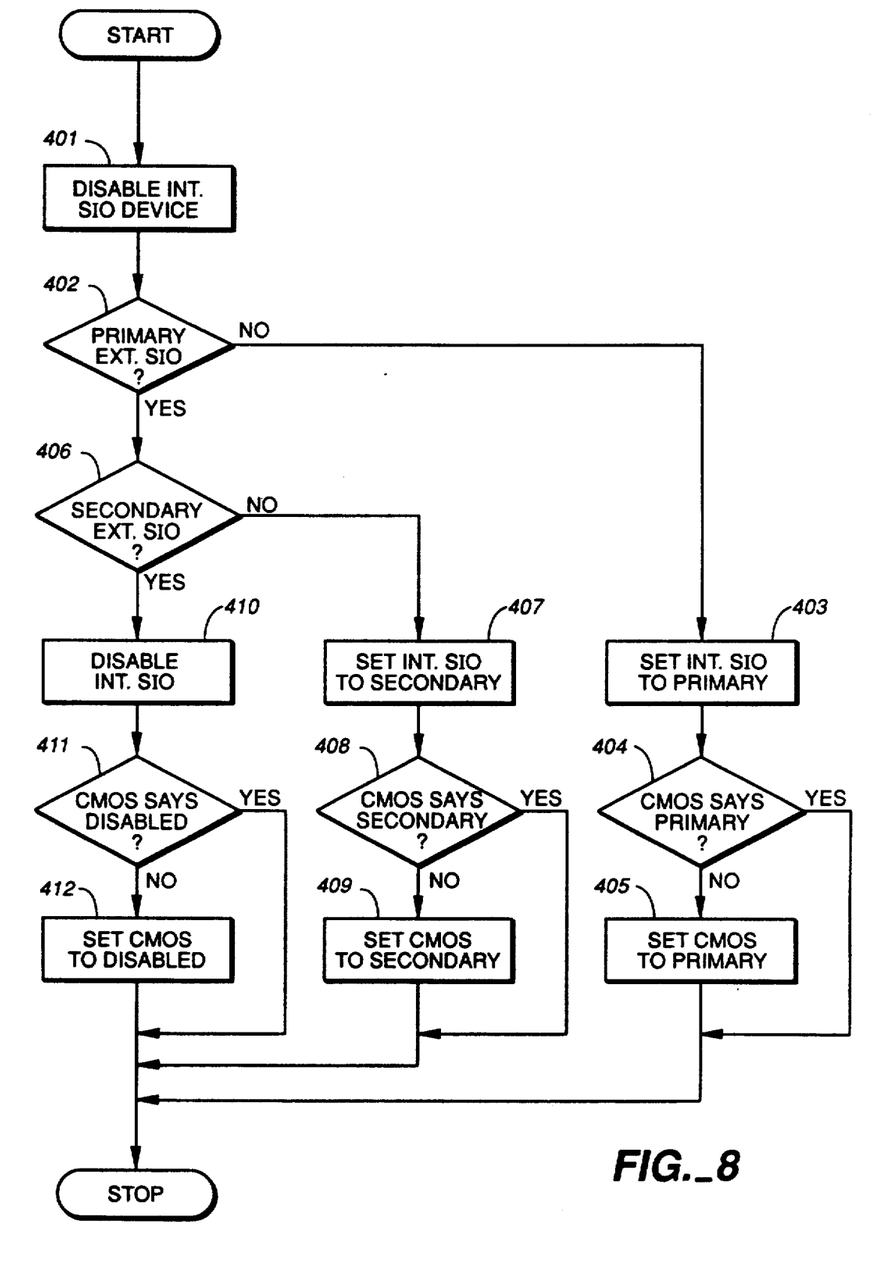
FIG. 8 is a flow chart of an exemplary subroutine for automatically selecting between internal/external serial I/O devices.
Figure 9:
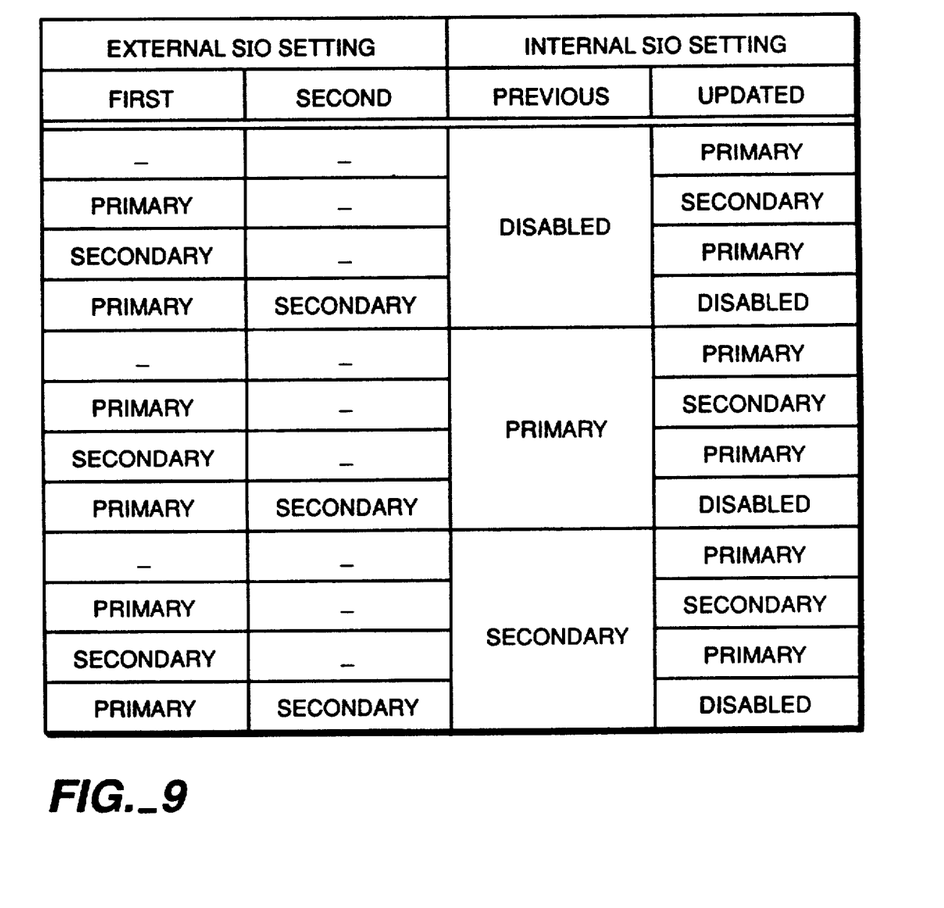
FIG. 9 is a table of the before and after effects of having none, first, second, or all external serial I/O devices added on internal I/O configurations.

FIG. 8 is a sub-routine (utility) used to set the internal SIO 34 and the two optional external SIOs 24 and 25 to "disabled", "primary", or "secondary" logical I/O functions. FIG. 9 charts the desired outcomes of the program of FIG. 8. The internal SIO 34 is always present, but if both external SIOs are also present, then SIO 34 is disabled. But if neither of the external SIOs is present, then the internal SIO 34 becomes "primary". The other combinations of SIOs are listed in FIG. 9. A device configuration utility (such as that of FIG. 8) is stored in ROM 91 and when run examines the startup configuration of external SIO devices 24 and 25 and allocates the appropriate I/O port address assignment to internal SIO device 34. The device configuration utility changes the designation of the I/O port previously set in CMOS RAM 61 by the user. The possible I/O port conditions a user may select from are: "primary", "secondary", and "disabled". Port addresses 3F8 (Hex) is assigned for "primary", 2F8 (Hex) for "secondary", and no I/O port address is assigned for internal SIO device for "disabled". Other port addresses are, of course, possible. The addresses above are merely exemplary and are commonly used for serial I/O in popular personal computer systems.

Referring now to FIG. 8, beginning at step 401, the internal SIO device 34 is disabled (so that it will not interfere with attempts to read the external SIO, below). In step 402, a test is made to see whether either external SIO device 24 or 25 has been designated "primary". If not, or if not present, then internal SIO device 34 is designated "primary", in step 403. Step 404 checks settings within CMOS RAM 61 to see if the internal SIO was set to be "primary", and if not, the setting is changed to indicate "primary", in step 405. Step 406 checks to see if either external SIO 24 or 25 has been designated as "secondary". If not, then internal SIO device 34 is designated as "secondary", in step 407. In step 408, a check of whether settings within CMOS RAM 61 say internal SIO 34 is "secondary" is made. If not, step 409 makes settings within CMOS RAM 61 to reflect internal SIO 34 as "secondary". If both SIO devices 24 or 25 are present, then step 410 disables internal SIO 34. Step 411 checks to see whether settings within CMOS RAM 61 show SIO 34 is "disabled". If not, step 412 makes settings within CMOS RAM 61 to reflect internal SIO 34 as "disabled".

Figure 10:
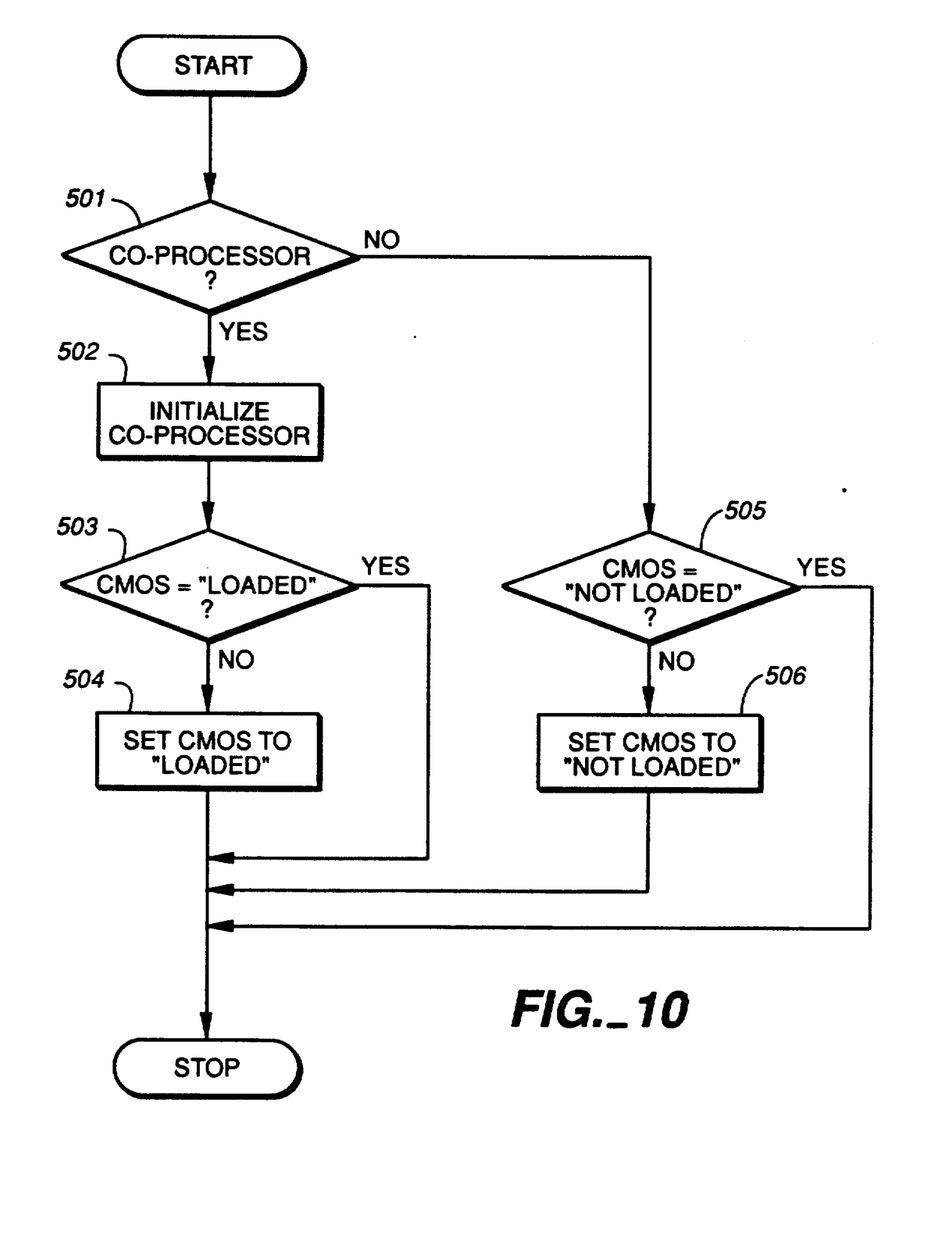
FIG. 10 is a flow chart of an exemplary subroutine for automatically embracing an added-in co-processor expansion board.

In FIG. 10, a flowchart is presented of an exemplary program to detect the presence of an add-in expansion board having a co-processor. In step 501 the presence of a co-processor is tested. If not detected, step 505 asks the question does the CMOS RAM 61 say the co-processor is not loaded. If so, the program ends. But if not, then step 506 is used to write the data in CMOS RAM 61 to indicate a co-processor is not installed. But if the answer to step 501 is "yes", then step 502 does the required initialization of the co-processor. (The exact initialization program required is dependent on the co-processor used, and the major manufacturers provide publicly available information on the required procedures.) Step 503 asks the question does the CMOS RAM 61 say the co-processor is loaded. If so, the program ends. But if not, then step 504 is used to write the data in CMOS RAM 61 to indicate a co-processor is installed (and initialized).

In an alternative embodiment, when the previous setting of CMOS RAM 61 by a user and the actual connection of external I/O devices do not match, the CMOS RAM 61 data are changed to reflect the actual configuration. Alternatively, instead of changing data within CMOS RAM 61, a particular I/O device may be selected to reflect the new actual connection of an external I/O device. For instance, when external I/O device 20 has been connected, it can be selected without regard to settings within CMOS RAM 61, and if external I/O device 20 has not been installed, then internal I/O device 30 is selected without regard to settings within CMOS RAM 61.

While the invention has been described in conjunction with specific embodiments, it will be apparent to those skilled in the art that many further alternatives, modifications, and variations will be possible, in light of the foregoing disclosure. Thus, the invention described herein is intended to embrace all such alternatives, modifications, applications, equivalents, and variations as fall within the spirit and scope of the claims below.

What is claimed is:

1. A process of configuring a computer system having an internal Serial Input/Output (SIO) port, at least one external SIO port, said SIO ports having internal control registers wherein said control registers store information indicative of the designation of the corresponding SIO port as primary, secondary, or disabled, and a non-volatile memory for storing a user's designation of each SIO port as either primary, secondary, or disabled, comprising the steps of:

a) disabling said internal SIO port;

b) determining whether any of said at least one external SIO port has been designated as primary in its corresponding control register;

c) setting said internal SIO port control register designation to be primary, if the determination of step (b) is negative;

d) determining if said non-volatile memory contains information indicative of said internal SIO port being designated as primary, said process being complete if the determination of step (d) is affirmative;

e) setting said non-volatile memory to contain information indicative of said internal SIO port being designated as primary if the determination of step (d) is negative, said process being complete after the setting of step (e);

f) determining whether any of said at least one external SIO port has been designated as secondary in its corresponding control register if the determination of step (b) is affirmative;

g) setting said internal SIO port control register designation to be secondary, if the determination of step (f) is negative;

h) determining if said non-volatile memory contains information indicative of said internal SIO port being designated as secondary, said process being complete if the determination of step (h) is affirmative;

i) setting said non-volatile memory to contain information indicative of said internal SIO port being designated as secondary if the determination of step (h) is negative, said process being complete after the setting of step (i);

j) disabling said internal SIO port if the determination of step (f) is affirmative;

k) determining if said non-volatile memory contains information indicative of said internal SIO port being designated as disabled, said process being complete if the determination of step (k) is affirmative; and l) setting said non-volatile memory to contain information indicative of said internal SIO port being designated as disabled if the determination of step (k) is negative, said process being complete after the setting of step (l).

2. The method of claim 1 wherein said non-volatile memory comprises a CMOS RAM.

* * * * *